United States Patent [19]

Kingham

[11] Patent Number: 4,570,899
[45] Date of Patent: Feb. 18, 1986

[54] ADJUSTABLE SLOW CLOSING VALVE ASSEMBLY

[75] Inventor: Paul E. Kingham, Milford Center, Ohio

[73] Assignee: Household Manufacturing, Inc., Prospect Heights, Ill.

[21] Appl. No.: 672,830

[22] Filed: Nov. 19, 1984

[51] Int. Cl.⁴ ............................................. F16K 47/04
[52] U.S. Cl. ...................................... 251/51; 138/45; 138/46; 251/52; 251/120
[58] Field of Search ..................... 251/50, 51, 52, 120; 138/45, 46

[56] References Cited

U.S. PATENT DOCUMENTS

| | | | |
|---|---|---|---|
| 1,531,541 | 3/1925 | Simmons | 251/51 |
| 1,995,792 | 3/1935 | Brown | 251/52 |
| 2,181,581 | 11/1939 | Fraser | 251/52 |
| 2,212,308 | 8/1940 | Steen | 251/52 |
| 2,710,736 | 6/1955 | Miller | 251/51 |
| 2,991,795 | 7/1961 | Fraser et al. | 251/52 |
| 3,374,805 | 3/1968 | Trevarrow et al. | 137/843 |

FOREIGN PATENT DOCUMENTS

| | | | |
|---|---|---|---|
| 392151 | 5/1933 | United Kingdom | 251/51 |
| 431448 | 7/1935 | United Kingdom | 251/52 |
| 1337256 | 11/1973 | United Kingdom | 251/52 |

Primary Examiner—George L. Walton
Attorney, Agent, or Firm—Banner, Birch, McKie & Beckett

[57] ABSTRACT

An adjustable slow closing valve assembly includes a valve body having a bore to receive a valve cartridge with inlet and outlet ports communicating with the bore, the valve cartridge having a tubular retainer providing means defining a valve seat and means reciprocably mounting a valve stem with the stem carrying an operating handle at one end and a valve member adjacent the other end to cooperate with the seat. The valve cartridge further includes a thimble-shaped cup defining a cylindrical dash-pot chamber facing the valve seat on the retainer and the valve stem has a plunger sealingly reciprocable within the dash-pot chamber, the chamber being in fluid communication with the inlet port on the side of the plunger facing the valve seat and a resilient umbrella valve carried by the cup places the other side of the plunger in communication with the inlet port, the umbrella valve allowing restricted flow of fluid into the chamber upon plunger movement in one direction and relatively free egress of fluid from the chamber upon reverse plunger movement. Adjustable spring means biases the plunger in the one direction.

7 Claims, 5 Drawing Figures

ADJUSTABLE SLOW CLOSING VALVE ASSEMBLY

FIELD OF THE INVENTION

This invention relates generally to automatic self-closing measuring valves and, more particularly, to an adjustable slow closing valve especially useful for water conservation when used in lavatory faucets in schools, institutions, public washrooms and the like.

BACKGROUND OF THE INVENTION

Self-closing measuring valves, particularly as embodied in lavatory faucets, have been known in the art for many years. This type faucet is generally characterized by having a manually depressable handle which, when depressed, initiates flow through the faucet. Unless the handle is held in this manually depressed condition, the operating mechanism of the faucet valve acts to slowly close the valve, returning the handle to its uppermost position in readiness for a succeeding manual actuation of the slow self-closing faucet.

Slow closing lavatory faucets offer the advantage of assuring that the faucet valve is closed in a matter of a few seconds time so that thereby water usage is conserved and, more importantly, that in the absence of an intending user, the faucet is fully shut off against continued or indefinite water flow through the faucet if the last user intentionally or otherwise overlooked turning off the faucet. Slow closing lavatory faucets are particularly valuable in conserving water when employed in public washrooms, large institutions and the like.

The art also has recognized the desirability in slow self-closing lavatory faucets of having an adjustability capability for the faucet valve so that the time during which the slow closing operation takes effect after handle depression and manual release of the handle initiates water flow can be changed. In some applications for these slow closing lavatory faucets, it may indeed be desirable to have a longer flow duration than in installations where a relatively brief flow duration occurs between handle depression and water shut-off.

Frequently, slow self-closing lavatory faucets in the prior art have employed a dash-pot form of delay mechanism. This type delay mechanism usually finds it necessary to incorporate a restrictor valve which in effect meters or restricts the flow of fluid into the mechanism, thereby slowing the mechanism down to gain the desired slow closing of the faucet valve which is under control of this mechanism.

This sort of restrictor valve is frequently quite sensitive to the presence of dirt or foreign material such as rust particles which are invariably present in large, and particularly old, city water systems. This foreign material flowing through the water system into the restrictor valve of the slow self-closing lavatory faucet tends to build up and eventually clog the restrictor valve. Thereupon difficult and expensive cleaning of the entire slow self-closing lavatory faucet frequently becomes necessary.

Attempts to handle this clogging problem by the use of filters or other screening techniques have only transferred the clogging problem from the restrictor valve becoming clogged to the filter or screen leading to the restrictor valve becoming clogged. In either event the slow self-closing valve requires expensive and frequent cleaning.

Further, prior art solutions to obtaining an adjustability capability for varying flow duration have not been entirely satisfactory. The adjustable feature to gain this varying flow duration capability is too often inaccessible from the exterior of the slow closing valve faucet, thereby making it necessary to undertake major disassembly of the faucet simply to obtain variation in the duration of the water flow after the handle is manually depressed.

SUMMARY OF THE INVENTION

It is therefore an object of the present invention to provide an improved, simplified, inexpensive, and effective slow closing valve particularly suitable for lavatory faucet use in industrial applications and the like, where water conservation is a prerequisite.

A further important object of this invention is to provide a slow closing valve incorporating a simple resilient flow control valve means which is essentially self cleaning upon each successive handle depression to initiate water flow for a predetermined duration.

It is also an object of this invention to provide a slow closing valve wherein varying flow durations following each valve handle depression may be easily obtained by simple adjustment of the valve biasing means which is readily accessible immediately beneath the exposed valve handle.

The above objects, other objects and various features of novelty which characterize this invention will become more apparent in conjunction with the detailed description of the invention and pointed out with particularity in the claims annexed to and forming a part of this application.

However, for a better understanding of the invention, its advantages and specific objects obtained by its use, reference should now be had to the accompanying drawing and description that follows in which there has been illustrated and described a preferred embodiment of the invention.

DETAILED DESCRIPTION OF A PREFERRED EMBODIMENT

Figure 1:
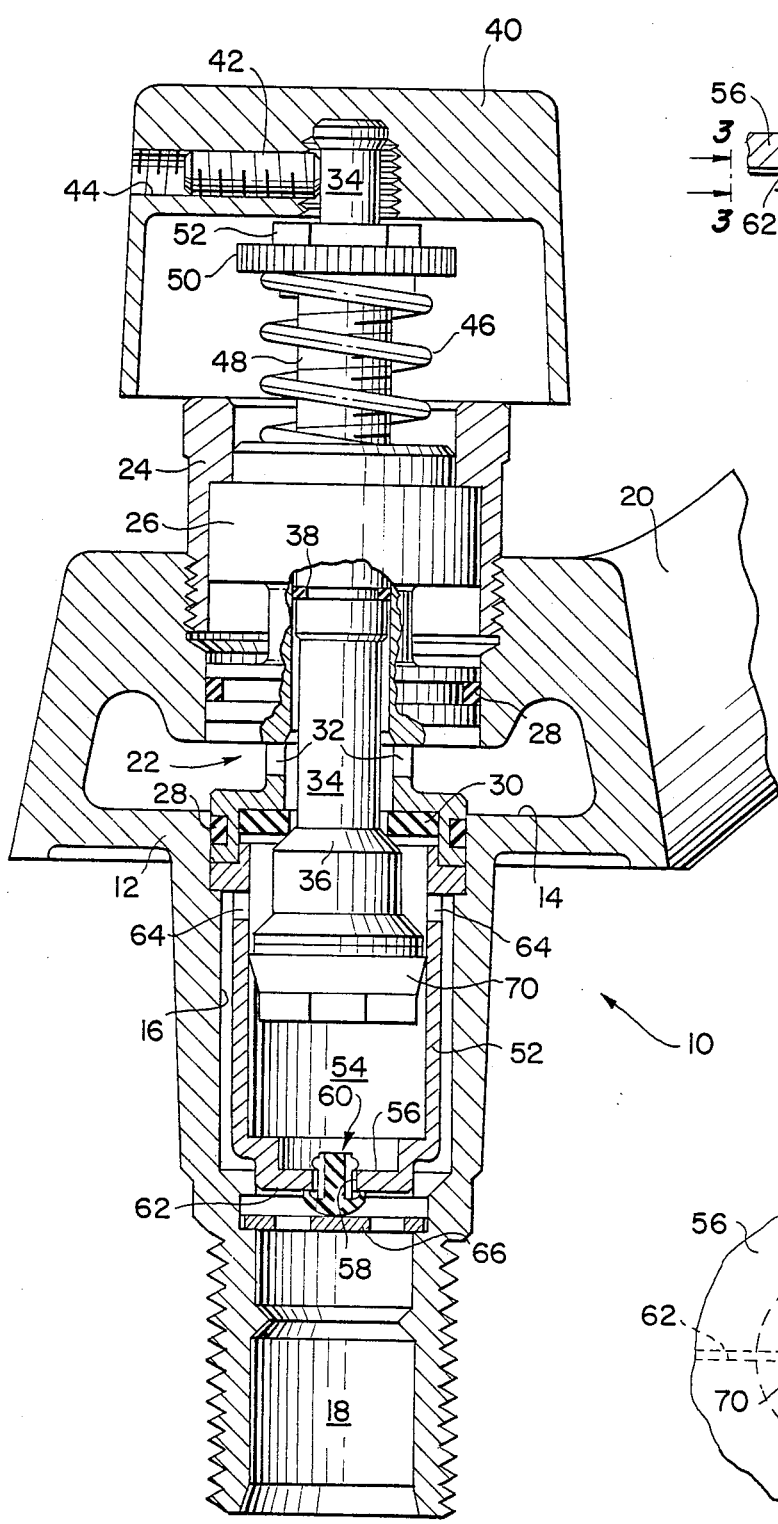
FIG. 1 is a sectional view of the adjustable slow closing valve assembly of this invention.

FIG. 1 on the drawing shows the complete slow closing valve assembly 10 with the major parts of this assembly shown in section. The assembly includes a valve body 12 which may be of cast metal, such as brass, having an internal cavity 14, this cavity including a bore 16. The bore of cavity 14 has an inlet port 18 which is externally threaded in accordance with conventional practice for connecting the valve assembly into a suitable water system. The bore 16 opens into an enlarged portion of cavity 14 which leads to a suitable faucet spout 20 providing an outlet port from the valve body, only a portion of spout 20 being shown on FIG. 1 to simplify the drawing.

The bore 16 of cavity 14 receives a valve cartridge 22. The components making up this cartridge are retained within bore 16 and thus within valve body 12 by a externally threaded bonnet 24 that is threaded into the internally threaded upper end of bore 16.

The cartridge 22 includes a tubular retainer 26. A pair of spaced annular seals 28, which may be provided by resilient O rings, are received in spaced external grooves formed on the exterior of tubular retainer 26. Seals 28 on retainer 26 are located above and below the enlarged portion of cavity 14, respectively, to seal against the wall of bore 16 and thereby prevent outward leakage of water from cavity 14.

The tubular retainer 26 further provides a stationary valve seat carrying an annular resilient washer 30. For egress of water from the interior of retainer 26 after passing through the valve seat washer 30 on retainer 26, there are provided four radial openings 32 leading into the enlarged portion of cavity 14, this portion communicating with the outlet port provided by the faucet spout 20.

The tubular retainer 26 reciprocably mounts a valve stem 34. A valve member to cooperate with annular resilient washer 30 on retainer 26 in cutting off fluid flow when the valve assembly 10 is closed, is provided by a conical portion 36 on valve stem 34. As may be easily seen from FIG. 1, this conical portion 36 faces the annular resilient washer 30 so that when valve stem 34 is in its uppermost position, fluid flow is shut off by conical portion 36, forming a valve member, cooperating with the valve seat provided by annular resilient washer 30.

The valve stem 34 where it slides within tubular retainer 26 is provided with an external groove which carries an annular seal 38 appropriately provided by a resilient O ring. Seal 38 is a dynamic seal, moving with the valve stem 34 within retainer 26 to prevent water from going up around the stem 34 when the stem is depressed to shift the valve assembly 10 to open condition.

An operating handle 40 is fixedly secured to the outer end of valve stem 34 so as to be disposed exteriorally of the valve body 12. A suitable set screw 42 may be threaded into an internally threaded radial bore 44 formed in handle 40 to be tightened down against the outer end of stem 34 to fixedly secure handle 40 to the stem while enabling removal of the handle to adjust the spring force applied by the adjustable biasing means acting on stem 34 to urge it outwardly of valve body 12.

The biasing force acting on stem 34 is provided by a coil spring 46 surrounding a threaded portion 48 of stem 34. One end of spring 46 rests on the outer end of tubular retainer 26 while an adjusting nut 50 is threaded onto the portion 48 of stem 34 to apply compressive force to the opposite end of spring 46. A locknut 52 overlying adjusting nut 50 may be threaded onto portion 48 of stem 34 to lock the adjusting nut 50 in its desired location, thereby applying the desired biasing force acting on stem 34 to close the valve member provided by conical portion 36 on stem 34 against the valve seat provided by annular resilient washer 30.

The end of valve cartridge 22 opposite operating handle 40 is provided by a thimble-shaped cup 52. The outer diameter of cup 52 is less than the diameter of bore 16 within which the cup is received such that fluid flow from inlet port 18 is free to flow up around the exterior of cup 52. The end of cup 52 adjacent tubular retainer 26 has cylindrical and annular flanges which snugly mate with the end of tubular retainer 26 immediately adjacent the annular resilient washer 30 forming the valve seat at one end of retainer 26.

The inner wall of thimble-shaped cup 52 defines a cylindrical dash-pot chamber 54. The closed end wall 56 of cup 52 is formed with an aperture 58 which receives and retains a resilient flow control valve member 60. The construction of control valve member 60 may be best seen from FIGS. 2 and 4.

The exterior surface of end wall 56 of thimble-shaped cup 52 is formed with a small coined V groove 62 extending diametrically across this exterior surface, the groove 62 being interrupted only by the central aperture 58 which receives and retains valve member 60.

The cylindrically shouldered segment of cup 52 disposed radially outwardly of end wall 56 may be guidingly received in shouldered sections on the interior of bore 16, these sections being interrupted to allow free flow of fluid from inlet port 18 upwardly into the annular space between the exterior of the cylindrical wall of cup 52 and interior of bore 16. The opposite end of cup 52, where it matingly interengages with the adjacent end of tubular retainer 26 is provided with four radial apertures 64. Apertures 64 permit this fluid flow to enter into the chamber portion of cup 52 immediately adjacent the valve member provided by conical portion 36 on stem 34 and valve seat provided by annular washer 30.

An apertured retainer plate 66 may be provided to rest on an interior shoulder in the passageway between inlet port 18 to bore 16. This plate 66 then serves as an added safeguard for retention of the resilient valve member 60 in the central aperture 58 of end wall 56 of cup 52.

To cooperate with the cylindrical dash-pot chamber 54 provided within thimble-shaped cup 52, the valve stem 34 carries a plunger 70 at its end opposite the exterior operating handle 40. Plunger 70 may consist of an endplug threaded on valve stem 34 to secure an upwardly facing cup washer against an annular washer on stem 34. Plunger 70 basically by reliance on its cup washer, sealingly engages with the wall of dash-pot chamber 54 defined within thimble-shaped cup 52. Since plunger 70 is connected as a part of stem 34, it reciprocates within dash-pot chamber 54 with its cup washer preventing flow of fluid to pass above or below the plunger 70 as it reciprocates within dash-pot chamber 54.

The resilient control valve member 60 as retained in aperture 58 of end wall 56 of cup 52 cooperates with the V groove 62 to provide a resilient flow control valve means which allows restricted flow of fluid into the closed end of chamber 54 upon the movement of plunger 70 and stem 34 outwardly of valve body 12. The biasing force applied to stem 34 by spring 46 urges this direction of movement of plunger 70 as long as the operating handle is not being manually pressed against the biasing force of spring 46.

Figure 2:
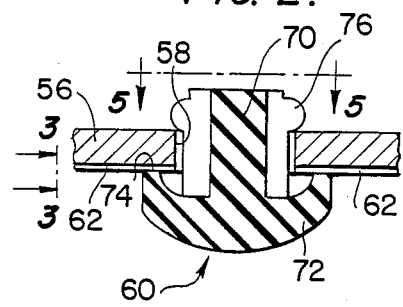
FIG. 2 is an enlarged detailed section of the resilient flow control valve means mounted in the end wall of the thimble-shaped cup defining the cylindrical dash-pot chamber incorporated in the slow closing valve.
Figure 3:
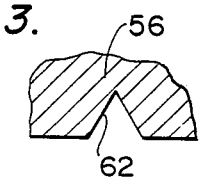
FIG. 3 is a detailed section taken along line 3—3 of FIG. 2.
Figure 4:
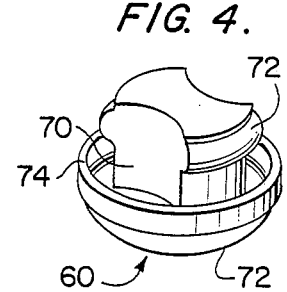
FIG. 4 is a perspective view of the resilient flow control valve member shown in section on FIG. 2.

As may be best seen in FIGS. 2 and 4, the control valve member 60, consisting in its entirety of resilient material, has a stem element 70 with an umbrella-shaped portion 72 integral with one end of stem element 70. This umbrella-shaped portion 72 defines an annular lip 74 which overlies and is resiliently pressed against the exterior surface of wall 56 of cup 52, that is, the surface containing the diametrical coined V groove 62. The opposite end of stem element 70 of control valve member 60 is provided with an enlargement 76. It will thus be seen that when the stem element 70 is inserted through aperture 58 in end wall 56, this enlargement 76 on the free end of stem element 70 acts to retain the control valve member 60 on wall 56 within aperture 58.

Figure 5:
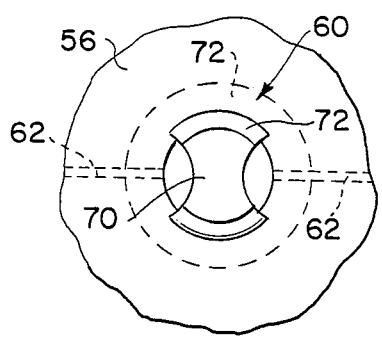
FIG. 5 is a plan view taken from line 5—5 of FIG. 2 showing mounting of the flow control valve member.

As may be seen from FIGS. 2, 4, and 5, the discontinuous cylindrical cross-section of stem element 70 readily permits fluid flow to and from the underside of the umbrella-shaped portion 72 of member 60, this action occurring in connection with reciprocating movements of plunger 70 within the cylindrical dash-pot chamber 54 of cup 52.

The intercooperation between the resilient valve member 60 and the coined V groove 62 in the exterior surface of wall 56 of cup 52 provides the resilient flow control valve means operable with plunger 70 as it reciprocates within dash-pot chamber 54. Thus, the operating action of this resilient flow control valve means may now be described in a water flow control environment wherein the slow closing valve assembly is installed.

With inlet port 18 suitably connected to a water supply, when the supply source is turned on, water flows into port 18, through perforated retainer plate 66 and up around thimble-shaped cup 52 along the interior of bore 16. This flow enters the upper end of cup 52 through radial ports 64 and tends to push the stem 34 downwardly by its action against the cup washer of plunger 70. However, as the water pressure stabilizes within the valve assembly, the biasing force of spring 46 causes stem 34 to rise to its normal position where the valve member 36 and valve seat 30 are closed and water flow is shut off. In this normal operation, there then exists water in the upper portion of cup 52 above plunger 70 as well as water in the lower dash-pot chamber 54 within cup 52.

With normal adjusted compression applied to spring 46 by threading nut 50 down onto stem 34, a manual pressure of approximately 6 pounds applied to operating handle 40 acts to rapidly expel water from dash-pot chamber 54 by spreading the umbrella-shaped portion 72 of member 60. This water is expelled out toward inlet port 18 and passes back up around the outerwall of cup 52, through apertures 64 and into the upper end of cup 52 above plunger 70 where the valve seat 30 and valve member 36 have now separated incident the downward movement of valve stem 34. Thus, the water flow continues up through the interior of tubular retainer 26, out through radial openings 32, into the enlarged portion of cavity 14 within valve body 12 and out through the outlet port provided by faucet spout 20.

After manual downward pressure on operating handle 40 is released, a restricted flow of water flows back into dash-pot chamber 54, passing through V groove 62 beneath the lip 74 of valve member 60. This action takes place by reason of the fact that spring 46 is now biasing valve stem 34 and operating handle 40 upwardly toward closing valve member 36 against valve seat 30. Also the umbrella-shaped portion 72 has returned to its condition as shown on FIGS. 1 and 2 where its lip 74 rests on the exterior surface of end wall 56 of cup 52.

In this condition of the parts, the restricted flow of water into dash-pot chamber 54 occurs by way of the small coined V groove 62 formed on the exterior surface of wall 56. With this restricted flow of water entering dash-pot chamber 54, plunger 70 allows valve stem 34 under the biasing action of compression spring 46 to slowly move back into its normal closed valve condition. Slow closing valve assembly 10 is then in readiness for a repeated operation by manual pressure being applied to the operating handle 40 to thereby repeat the operating cycle.

The adjustability provided by adjusting nut 50 acting on compression spring 46 permits easy variation in the duration of water flow for the slow closing valve. A normal flow duration time with this valve would be considered to vary between flow for 10 to 15 seconds. By adjusting nut 50 down to further compress spring 46, this flow duration time can be reduced to a minimum of approximately 2 seconds.

Adjustment of the biasing force provided by spring 46 may be carried out as follows. Set screw 42 is backed off from its engagement with the end of valve stem 34, thus permitting removal of operating handle 40. At this stage, lock nut 52 and adjusting nut 50 are readily accessible. Lock nut 52 may be released and adjusting nut 50 tightened clockwise down onto stem 34 to put more compression on spring 46 if a shorter water flow duration time is desired. Similarly, to obtain a longer water flow duration time, nut 52 may be released and adjusting nut 50 turned counter-clockwise to lighten the compressive force applied to spring 46. Then a longer water flow duration time would be the result.

An important feature of this invention is derived from utilizing the all resilient material control valve member 60 which has its stem element 70 integral with the umbrella-shaped portion 72, with the stem element having the enlargement 72 which acts to retain the resilient member 60 on the end wall 56 of cup 52, once the stem element 70 has been inserted through the aperture 58 in this wall 56. This control valve member 60 in conjunction with the small coined V groove 62 provides the resilient flow control valve means which allows restricted flow of fluid into the cylindrical dash-pot chamber 54 limited by the small size of the V groove 62. On the otherhand, the umbrella-shaped portion 72 of member 60 in this resilient flow control valve means permits relatively free egress of fluid flow from chamber 54 when the plunger 70 moves down under manual pressure applied to operating handle 40.

The umbrella-shaped portion 72 of member 60 provides the slow closing valve assembly 10 with excellent repeatability characteristics. Each time the slow closing valve assembly is activated by manual depression of operating handle 40, all of the passageways associated with control valve member 60, including the small coined V groove 62, are actively flushed with the water flowing out of dash-pot chamber 54. Thus, the control valve member 60 is essentially self-cleaning with respect to any particles or other foreign matter which might be present in the water system with which the slow closing valve assembly 10 is associated.

While a preferred coined V groove 62 has been described and illustrated, it will be recognized that other forms or configurations of restricted flow paths beneath the lip 74 of umbrella-shaped portion 72 of member 60 may be formed on the exterior surface of end wall 56, all within the scope of this invention.

While a preferred embodiment of the invention has been disclosed in detail hereinabove, it will be apparent to those skilled in the art that the disclosed embodiment may be modified and varied within a wide range of structural details, all possible and recognizable within the spirit of the invention herein. Therefore, the foregoing description and accompanying drawing are to be considered only as exemplary and not limiting, the true scope of the invention being defined and established by the appended claims.

I claim:

1. A slow closing valve comprising:
   a valve body having a cavity with inlet and outlet ports communicating with said cavity and a valve seat defined within said cavity intermediate said ports;
   a valve stem reciprocably mounted on said body within said cavity carrying an operating handle disposed exteriorly of said valve body and a valve member to cooperate with said seat;
   wall means defining a dash-pot chamber with one end of said chamber being in communication with both said inlet port and said valve seat;
   a plunger sealingly reciprocable within said chamber between the chamber ends, said plunger being connected to reciprocate with said valve stem;
   resilient flow control valve means mounted on said wall means and placing the other end of said chamber in communication with said inlet port, said flow control valve means including a control valve member consisting of a body of resilient material having a stem element and an enlarged circular portion integral with one end of said element, said stem element serving to freely mount said member by extending through an aperture formed in the area of said wall means mounting said member on an interior surface of said wall means whereby said member is constructed to allow restricted flow of fluid into said other end of said chamber upon plunger movement in one direction and relatively free egress of fluid flow from said chamber upon reverse plunger movement, said wall means area having its exterior surface formed to cooperate with and engage said enlarged circular portion to control the rate of said restricted flow of fluid and said enlarged portion being disengaged from said exterior surface upon reverse plunger movement; and
   biasing means urging said plunger in said one direction.

2. A slow closing valve as recited in claim 1 wherein said cavity includes a bore to receive a valve cartridge, said cartridge including a tubular retainer reciprocably mounting said valve stem and providing means defining said valve seat and a thimble-shaped cup defining said dash-pot chamber, said cup having access openings adjacent the open end of said cup communicating said inlet port with said chamber, and said flow control valve means being mounted in the end wall of said cup.

3. A slow closing valve as recited in claim 2 wherein said valve seat is provided by an annular resilient washer carried by said tubular retainer and said valve member is provided by a conical portion on said valve stem, said portion facing said washer to cooperate therewith under the urging of said biasing means.

4. A slow closing valve as recited in claim 1 wherein said biasing means includes coil spring means surrounding said valve stem exteriorly of said valve body and adjustable means threadably engaged with said stem acting on said spring means to adjust the compression of said spring means in altering the biasing force urging said plunger in said one direction.

5. A slow closing valve as recited in claim 1 wherein said exterior surface is formed with V groove means to cooperate with said control valve member.

6. A slow closing valve as recited in claim 1 wherein said enlarged circular portion is umbrella-shaped and the opposite end of said stem element is enlarged to retain said control valve member on said wall means area when said stem element has been inserted through said aperture.

7. A slow closing valve as recited in claim 6 wherein said surface of said wall means area is formed with V groove means underlying the lip of said umbrella-shaped portion of said control valve member to determined the rate of said restricted flow of fluid.

* * * * *